No. 772,232. PATENTED OCT. 11, 1904.
W. W. GILES.
CULTIVATOR.
APPLICATION FILED MAR. 18, 1904.
NO MODEL.
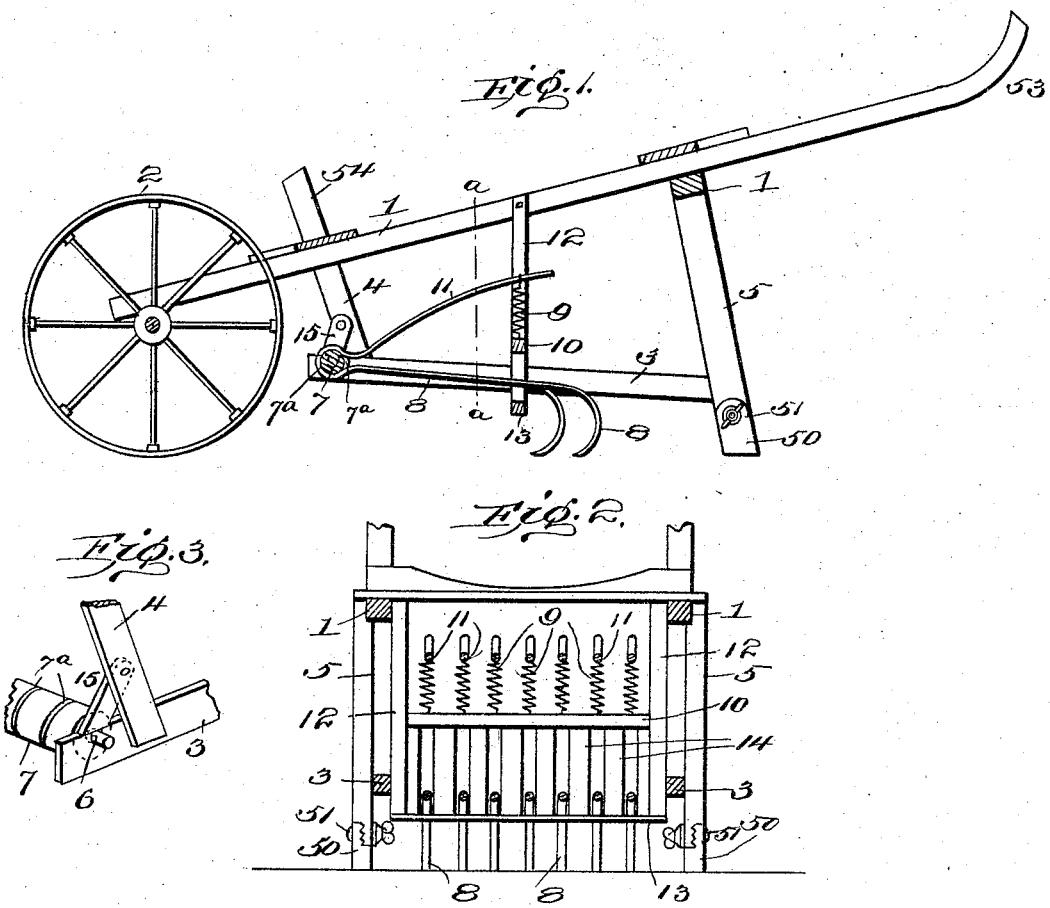

No. 772,232.

Patented October 11, 1904.

UNITED STATES PATENT OFFICE.

WILLIAM W. GILES, OF OCCOQUAN, VIRGINIA.

CULTIVATOR.

SPECIFICATION forming part of Letters Patent No. 772,232, dated October 11, 1904.

Application filed March 18, 1904. Serial No. 198,725. (No model.)

*To all whom it may concern:*

Be it known that I, WILLIAM W. GILES, a citizen of the United States, residing at Occoquan, in the county of Prince William and State of Virginia, have invented certain new and useful Improvements in Cultivators; and I do hereby declare the following to be a full, clear, and exact description of the invention, such as will enable others skilled in the art to which it appertains to make and use the same.

This invention relates to improvements in garden implements, particularly to that class of implements which is adapted for use as cultivators and wheelbarrows.

The invention consists in a portable frame and a removable cultivating device suspended therefrom.

It also consists in certain other novel constructions, combinations, and arrangements of parts, as will be hereinafter fully described and claimed.

In the accompanying drawings, Figure 1 is a central vertical longitudinal sectional view through the supporting-frame of my improved cultivator, showing a cultivating implement secured thereto; and Fig. 2 is a transverse vertical section taken upon the line *a a* of Fig. 1. Fig. 3 is a detail perspective view showing the locking means for holding the removable cultivator in the frame.

The present invention is designed to provide a mechanism which can be employed as a cultivator, while the framing of said mechanism is shown adapted for use as a wheelbarrow.

A practical embodiment of the invention has been illustrated in the drawings, in which is shown a frame 1, supported at one end by a wheel 2. The frame consists of side bars similar to those commonly employed in wheelbarrows, their forward ends resting upon the axle of the wheel 2. The bars are connected by suitable cross-pieces for bracing and holding the same in proper form. Depending from the frame 1 is a hanging frame composed of horizontal side bars 3, supported at their forward ends by inclined bars 4. Their rear ends are supported by depending bars or standards 5, which may be used also for supporting-legs when the apparatus is at rest. The suspended frame 3 is capable of holding a mechanism for cultivating the surface of the ground. In Fig. 1 the device is shown as having the cultivating implement in position. The forward ends of the bars of the frame 3 are provided with bearings 6, open upon their upper sides and capable of receiving the trunnions or journals carried by the ends of a cultivator cross-bar or head 7. The head 7 is preferably of much larger diameter than the journals and has secured to it a number of cultivator-teeth 8. The cultivator-teeth are pivotally secured to the head so that they will extend rearwardly, ending in ground-engaging hooks or curved teeth, as clearly shown in Fig. 1. In order that the teeth may engage the ground with a spring-pressure, I provide means for forcing them downwardly and have illustrated in Figs. 1 and 2 a simple and satisfactory method of accomplishing this purpose. The ends of the bars forming the teeth 8 are passed around the head 7, engaging grooves $7^a$ formed therein, so as to be pivotally secured thereto, and then the said bars are carried upwardly and rearwardly and connected by means of springs 9 with a cross-bar 10, supported in the frame of the implement. The bars, of which the teeth and the extending arms 11 thereof are generally formed, are of spring material; but in addition to the spring action of said bars it is preferable to employ additional tension means—as, for instance, the springs 9, just described. The bar 10 is supported in position by suspending side bars 12, which are bolted or otherwise secured at their upper ends to the frame 1. The lower ends of the suspending-bars 12 project below the cross-bar 10 and carry a second cross-bar 13. The cross-bar 13 is arranged below the teeth 8, so as to limit their downward movement. As shown in Fig. 2, it is desirable to employ spacing means between the cultivator-teeth 8, and the said spacing means may consist of vertically-arranged bars 14, secured between the cross-bars 10 and 13, having sufficient spaces between them for permitting of a free movement of the cultivator-teeth therein. The journals of the head 7 are locked in position in the bearings 6 by pivoted blocks, as 15, which are secured to the depending bars 4. When these blocks 15 are lowered over the journals, the said journals cannot become accidentally displaced. When, however, it is desired to remove the cultivator from the frame of the implement, it is quickly accomplished by turning the blocks 15 to one side upon their pivots and then removing the bolts which secure the suspending-bars 12 to the frame 1. This entirely frees the cultivating attachment from the frame of the implement.

The lower end of each of the legs or standards 5 may be provided with a pivoted section 50, held in position by a clamp-bolt 51. The meeting ends of the standards 5 and the extension 50 preferably lap, as shown in Figs. 1 and 2, and are formed with teeth fitting into each other, so that the said extensions 50 may be set at different angles with respect to the legs 9 and may be clamped therein by means of the bolts 51 passing through them. When the implement is being used as a cultivator, it is well to have the ends of the legs or standards 5 turned upwardly, so as to be farther removed from the surface of the ground and not in the way.

In adapting an implement of this character for hand use I find by experience that it is less tiresome to operate if the handles are arranged at such an angle that a pull may be exerted upon the same in forcing the implement forward. For this reason I preferably turn the ends of the handles on the frame 1 upwardly, as shown at 53. The operator standing between the handles of the device and leaning slightly forward in forcing the implement over the ground will thus have his hands and wrists in a more easy and comfortable position than if the handles were bent downwardly or permitted to project straight to the rear, as is common in wheelbarrows and hand-cultivators. In employing handles bent as described I find that the implement can be easily and well operated with the arms at full length, thus contributing to the ease with which the cultivator may be used and lengthening the endurance of the operator.

The frame 1 is admirably adapted for use as a wheelbarrow in addition to affording means for supporting the cultivator, the body of the wheelbarrow being placed upon the top of the frame 1 when it is to be thus used. The bars 4 are preferably projected above the frame 1, as at 54. These bars will hold the body portion of the wheelbarrow in position and make its attachment to the frame 1 an easy matter. While of course the frame may be provided with a barrow-body, it is equally useful without the same, as there are many instances, especially in farming life, where it is only necessary to have the supporting portion formed upon the frame, together with means for preventing a load from touching the barrow-wheel, such as the uprights 54. The frame, therefore, just as it appears in Fig. 1 is admirably adapted for use in carrying many loads—such, for instance, as cordwood, sacks of seed, and other material which can be laid across the frame of the barrow.

The implement above described is admirably adapted for use as a cultivator and a wheelbarrow. It will be noted that when the cultivator-teeth are in position for use each one is pressed against the ground independently of the other, since each is provided with its own spring. This makes it possible for each tooth to accommodate itself to any unevenness in the ground or to pass over obstacles thereon without affecting the other teeth of the device.

It will be evident that various minor changes may be made in the construction and arrangement of the parts and in the formation in the mechanical details thereof without departing from the spirit of the invention.

Instead of employing a number of springs, one for each cultivator-tooth, the cultivator-teeth may be rigidly secured to the head 7, and a single spring may also be rigidly secured to the said head for depressing the cultivator-teeth simultaneously, all within the spirit of the invention.

Having thus fully described my invention, what I claim as new, and desire to secure by Letters Patent, is—

1. A cultivating implement comprising a portable frame, and a removable spring-toothed cultivating mechanism pivotally suspended therefrom.

2. A cultivating implement comprising a portable carrying-frame, a suspended frame hinged from the under side thereof, and a toothed cultivating mechanism pivotally and removably mounted upon the said suspended frame.

3. A cultivating mechanism comprising a frame, a wheel carrying the same, a suspending-frame depending therefrom, and a cultivator pivotally mounted thereon and formed with individually-operable teeth.

4. A cultivating mechanism comprising a supporting portable frame, a removably-mounted cultivator journaled thereon formed with a series of teeth, and means for exerting a spring-pressure independently upon each of said teeth.

5. A cultivator comprising a portable frame, a removable ground-preparing device mounted thereon made up of a journaled head, a plurality of teeth carried thereby and pivoted thereon, an arm projecting from each tooth, and means for exerting a tension upon said arm for forcing each tooth downwardly.

6. A cultivating implement comprising a hand-operated frame, a cultivator suspended from the central part of said frame made up of a series of pivoted teeth, spacing means engaging the teeth for holding them a proper distance apart, and tension means exerting a downward pressure upon each tooth separately.

7. A cultivating implement comprising a portable frame, a suspending-frame mounted thereon, a cultivator carried by the suspending-frame formed of a head, teeth pivotally secured thereto, a guide-frame also depending from the portable frame, the said guide-frame having horizontal bars secured therein, spacing-bars extending between the horizontal bars and holding the teeth a proper distance apart, and springs secured at one end to one of said arms and at their other ends to the teeth of the cultivator for exerting a downward pressure upon the same.

8. A wheel garden implement comprising a frame, a wheel and means for supporting a cultivator, standards forming rests for the frame, end sections pivoted to the said standards, and means for clamping the end sections in different positions to shorten or lengthen the standards.

9. A garden implement comprising a carrying-frame, a wheel supporting the same, means for securing a cultivator to said frame and upwardly-extending handles formed by turning the ends of the frame-bars upwardly, the said handles making it possible to exert a pull in propelling the frame, with the wrists and arms in a comparatively straight and easy position.

10. A garden implement comprising a carrying-frame, a supporting-frame suspended from the carrying-frame near the ends thereof for distributing the weight upon the frame, and a cultivator removably mounted upon the suspended frame.

11. A garden implement comprising a wheeled frame formed with side bars, lateral connecting-bars joining the same, depending bars secured to the frame at a distance from the central portion thereof, connecting brace-bars connecting the lower portions of the depending bars, the suspending-frame thus formed stiffening the implement and distributing the weight to different parts of the frame, and a cultivator pivotally mounted on the said suspending-frame.

In testimony whereof I hereunto affix my signature in presence of two witnesses.

WILLIAM W. GILES.

Witnesses:
　CASSELL SEVERANCE,
　JOHN L. FLETCHER.